Oct. 10, 1961 R. L. HOLLINGSWORTH 3,004,111

COMPLEMENTARY MAGNETIC CORES FOR SELECTIVE MAGNETIC RECORD READOUT

Filed May 24, 1957 6 Sheets-Sheet 1

INVENTOR

R. LEE HOLLINGSWORTH

BY Linton and Linton

ATTORNEYS

INVENTOR
R. LEE HOLLINGSWORTH

BY Linton and Linton
ATTORNEYS

Oct. 10, 1961 R. L. HOLLINGSWORTH 3,004,111

COMPLEMENTARY MAGNETIC CORES FOR SELECTIVE MAGNETIC RECORD READOUT

Filed May 24, 1957 6 Sheets-Sheet 3

INVENTOR
R. LEE HOLLINGSWORTH

By Seaton and Seaton
ATTORNEYS

Oct. 10, 1961 R. L. HOLLINGSWORTH 3,004,111

COMPLEMENTARY MAGNETIC CORES FOR SELECTIVE MAGNETIC RECORD READOUT

Filed May 24, 1957 6 Sheets-Sheet 4

INVENTOR

BY R. LEE HOLLINGSWORTH

Linton and Linton

ATTORNEYS

INVENTOR
R. LEE HOLLINGSWORTH
By Linton and Linton
ATTORNEYS

INVENTOR
R. LEE HOLLINGSWORTH
BY Linton and Linton
ATTORNEYS 3,004,111

COMPLEMENTARY MAGNETIC CORES FOR SELECTIVE MAGNETIC RECORD READOUT

R. Lee Hollingsworth, 514 Hempstead Ave., West Hempstead, N.Y.

Filed May 24, 1957, Ser. No. 661,315
7 Claims. (Cl. 179—100.2)

The present invention relates to sound heads systems for recording sound and television signals on magnetic tape, and reproducing programs therefrom.

It is known to provide a magnetic recording head to record on metal or coated magnetic tape, audio signals and video signals, and to read them off the tape to reproduce the audio or video program which they represent. It is usual to provide a magnetic head consisting of a magnet of generally horseshoe shape in which a recording slot is cut at the summit of the convex surface, to provide a strong magnetic field which is applied to the tape. Recording and reproducing or read-out windings are provided on a part of the magnetic circuit of the horseshoe remote from the slot.

In the case of multi-track magnetic tapes, it is necessary to have means for recording or reading off each recorded intelligence track individually. If there is only one recording magnet and recording gap or slot, it is necessary to vary precisely move the head and slot across the tape just the required distance every time there is a shift from one track to another. This is likely to deface the tape and introduce noise.

Heretofore there have been provided sound heads having a plurality of layers of magnetic material as steel or highly permeable alloys, separated by layers of nonmagnetic material as copper, each layer of magnetic material constituting a separate magnetic circuit having individual recording gaps of the same number as the number of tracks on the tape. However it is still necessary to select the desired one of the programs on the respective sound track, and this is likely to involve relative movement of the tape over the head and gap, defacing the tape.

I provide means for selecting a desired sound track on a multi-track tape for recording or reproducing, without relative movement of the recording gap, which avoids the difficulties experienced in the prior art.

Magnetic tape and magnetic recording heads may also be employed for recording electrical signal elements corresponding to television picture signals, and recording and storing signals corresponding to various kinds of physical observations including radar signals, and business machine data, and the apparatus of my invention is adaptable for those purposes.

A purpose of my invention is to provide a two-piece magnetic circuit recording head device in which the lower winding-carrying piece is selectively magnetically engageable with the upper magnetic elements which are in register with the respective sound tracks of a multi-track sound tape and which is guided into final position by a detent.

A further purpose of my invention is to provide a track-selecting two-piece magnetic circuit in which a rotatable magnet selects the circumferentially positioned end of the upper magnet corresponding to the desired sound track.

Another purpose of my invention is to provide an interlocking structure for the mutually engageable ends of the two pieces of the recording magnetic circuit.

A further purpose of my invention is to provide a rubber roller to keep the sound tape in engagement with the gap or slot portion of the recording head.

A still further purpose of my invention is to provide means for magnetically recording and reproducing intelligence and data by means of a two-piece magnetic recording head having thin magnetic laminations in operating relation to the tape.

Still another purpose of my invention is to provide coin-controlled apparatus for selectively reproducing a desired one of a plurality of programs recorded on a multiple track sound tape.

The invention will be better understood by reference to the following specification and the accompanying drawings wherein, FIG. 1 shows in perspective a plural track magnetic sound tape with the cooperating split laminated magnetic recording head of my invention;

In the apparatus of my invention, provision is made for precisely maintaining the respective sound tracks on the tape in exact registration with the recording gap of the proper magnetic circuit element through which the intelligence of a given sound track is transmitted. Magnetic laminae are provided in the sound head to correspond respectively to the sound track areas, and the magnetic laminae are separated by interstitial non-magnetic laminae which may be copper, and this assembly is bolted or molded together as a unit by nonmagnetic molding material which may be plastic or copper, except the area immediately surrounding the gap. The entire recording head or heads may be encased in glass to protect against ambient deleterious conditions as humidity, except the recording gap area.

The apparatus of my invention may be employed for recording signals at very low speeds over a telephone line or narrow band radio channels, as a frequency modulation channel, at a low-traffic time of day, for utilization at normal speeds at a later time.

Figures 1, 2, 3, 4, 5, 6:
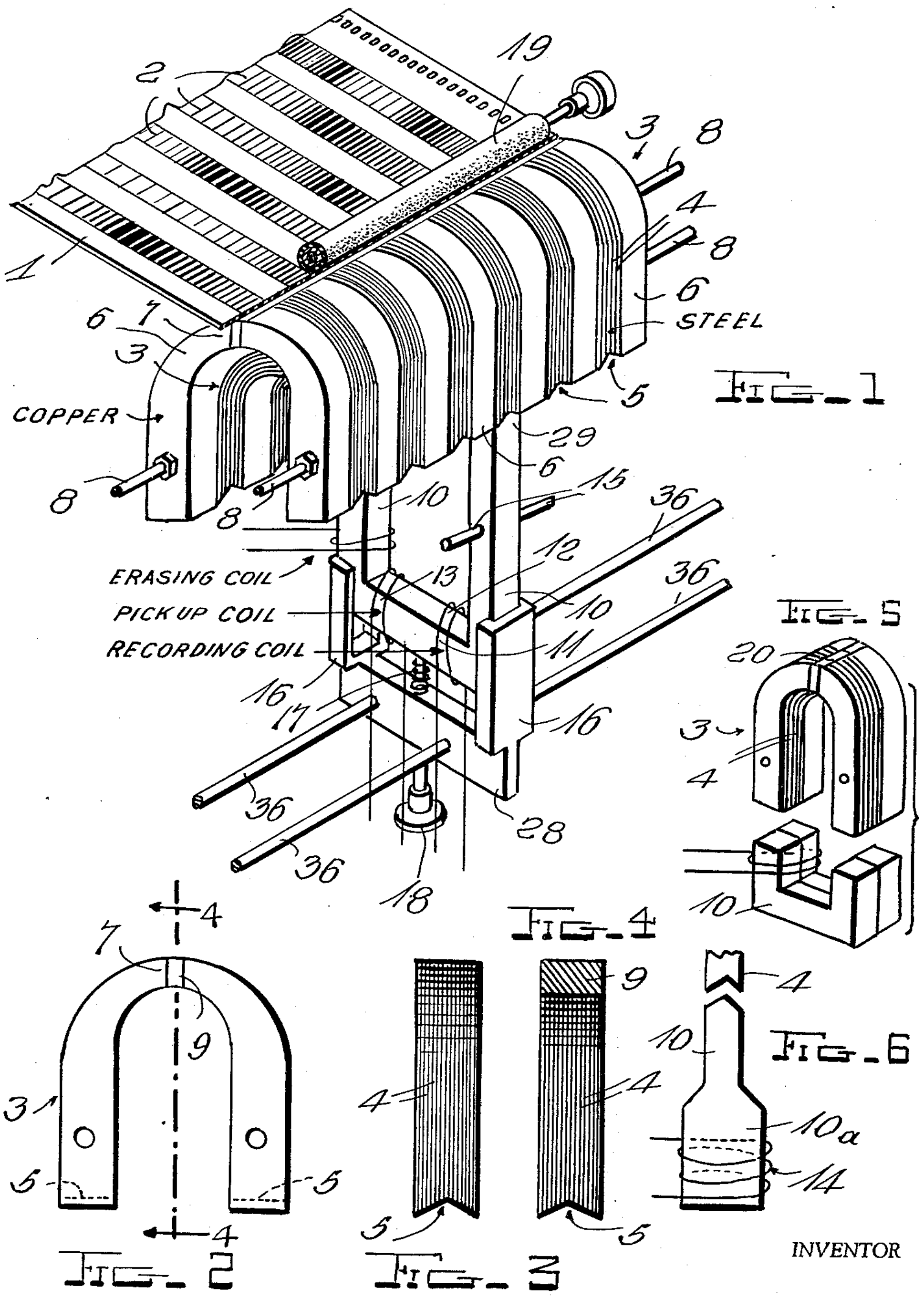
FIG. 2 shows in front elevation the upper portion of the assembled recording head of my invention, having the recording gap or slot.
FIG. 3 is a side elevation of the assembled head portion of FIG. 2.
FIG. 4 is a view taken on the line 4—4 of FIG. 3 looking in the direction of the arrows, of the upper portion of FIG. 2.
FIG. 5 is a modified form of recording head structure having right plane surfaces for the engaging surfaces of the ends of the upper and lower portions of the recording head.
FIG. 6 shows in elevation a modified enlarged and strengthened form of the recording head.

Referring to the drawings in detail, in FIG. 1, the magnetic tape is shown at 1, and has a plurality of spaced magnetic recorded intelligence tracks 2. The magnetic sound head consists of two pieces, of which the first is an upper horseshoe-shaped piece 3 which has an assembled stack of magnetic laminae 4 which may be of high permeability steel or alloy, and may be as thin as 1/32 of an inch or less, separated and shielded by non-magnetic spacers 6 which may be of copper. Preferably, the bottom free face of the legs of the horseshoe-shaped unit 3 are provided with a V cut 5 for interlocking purposes. The assembled stack of laminae are bolted together as by bolts 8, or molded into an integral unit as in copper or plastic. A transverse recording gap or slot 7 is cut across the top surface of the assembled magnetic laminae, over which the tape passes.

The second piece of the sound head consists of a U-shaped piece 10 having a transverse portion 11 connecting ends of its two legs. Wound on lower magnetic U-shaped piece 10 are a recording winding 12 and a reproducing winding 13 and an erasing winding 14, which are respectively connected to appropriate means conventional in the art. Slideways 16 are provided for slidably receiving and mounting lower magnetic piece 10, and are mounted on a suitable frame 28. A spring 17 acting against frame 28 urges magnetic piece 10 upward away from frame 28 and toward engagement with magnetic laminae 4 of horseshoe unit 3. A handle 15 is provided on U-shaped lower magnetic piece 10 for drawing it down against the action of spring 17 and out of engagement with a lamina of upper piece 3. A knob 18 is provided for manually laterally traversing frame 28 and magnetic piece 10 along rods 36 which are slidably received in frame 28.

It will be realized that I have provided for transversely cutting and separating into an upper part and lower part the usual one-piece sound head of the prior art, and by utilizing preferably one lower portion to carry the intelligence, cross talk is reduced between closely associated upper gap carrying units.

FIG. 2 shows an end elevation of the upper horseshoe-shaped magnetic piece 3 having recording gap 7.

FIG. 3 is a side elevation of a magnetic lamina 4 showing its end V-cut 5 in its relation to the complementary pointed end 29 of lower U-shaped magnetic piece 10.

FIG. 4 is a section taken through the gap on line 4—4 of FIG. 2, and shows a magnetic lamina 4 with non-magnetic material 9 filling the gap to prevent accumulation of undesirable stray foreign matter therein.

FIG. 5 shows in perspective as a modified form a magnetic lamina and adjacent non-magnetic lamina of an assembled horseshoe-shaped magnetic piece, with recording gap 20, in juxtaposition to a single U-shaped lower magnetic piece, wherein the horseshoe-shaped magnetic piece has flat terminal faces adjacent lower U-shaped piece 10, and U-shaped piece 10 also has flat terminal faces adjacent upper piece 3, instead of having a V-cut 5 and point 29.

FIG. 6 shows in elevation a modified form of the lower U-shaped magnetic piece, in which the thin pointed portion of a magnetic piece to engage a thin magnetic lamina 4 of the horseshoe upper magnetic piece 3, is enlarged at its end remote from upper element 3, to provide increased strength and better space on which to wind the actuating windings.

Figures 7, 8:
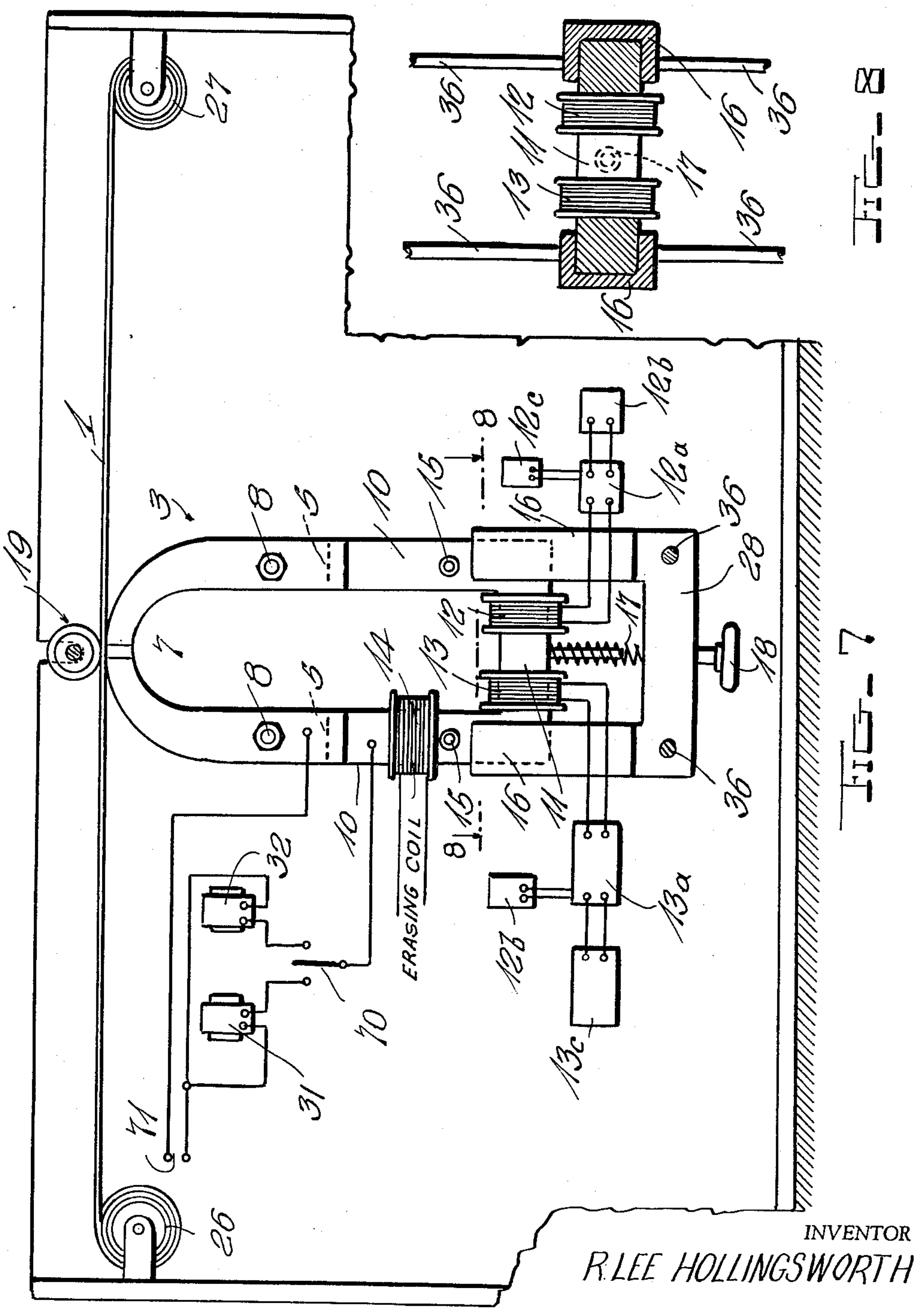
FIG. 7 shows in side elevation the constructional details of the split magnetic recording head with associated units.
FIG. 8 is a horizontal section taken on line 8—8 of FIG. 7.

FIG. 7 shows in side elevation the constructional details of the split magnetic recording head 3, over whose recording gap 7 there passes magnetic tape 1. Soft rubber roller 19 is mounted to urge the tape against the recording gap. The tape is wound from loading reel 26 onto take-off reel 27. The lower U-shaped magnetic piece 10 can slide in slideways 16 and has a transverse portion 11 and a recording winding 12, reproducing winding 13, and erasing winding 14. Slideways 16 are mounted on frame 28 which is slidably mounted on rods 36.

Recording winding 12 is connected through an amplifier 12*a*, which in turn is connected to a microphone 12*b* and a television camera 12*c*. Reproducing winding 13 is is connected to an amplifier 13*a*, which in turn is connected to a loud speaker 13*b* and a television receiver 13*c*. Erasing winding 14 is connected to a suitable current source as of alternating current.

A fast tape reel driving motor is shown at 31, and a slow driving motor is shown at 32, which may be selectively connected by two-way switch 70 to a source of direct current 71. One terminal of source 71 is connected to a lamina of upper piece 3 of the head, and the common terminal of the switch is connected to the bottom piece of head. When lower piece 10 is retracted and separated from upper piece 3, the energizing circuit of the motor is not energized and the driving motors are at rest. When lower piece 10 is pushed up into engagement with upper piece 3, the electric circuit is closed to drive the drive motor 31 or 32 as selected. In this way pieces 3 and 10 act as an electric switch for electric current as well as a magnetic flux switch, to control the travel of the tape.

FIG. 8 is a horizontal section taken on the line 8—8 of FIG. 7 and shows the transverse portion 11 of lower magnetic piece 10, with recording winding 12 and reproducing winding 13, and slideways 16 for receiving piece 10, and rods 36 on which the base which supports slideways 16 is slidably mounted.

Figures 9, 10:
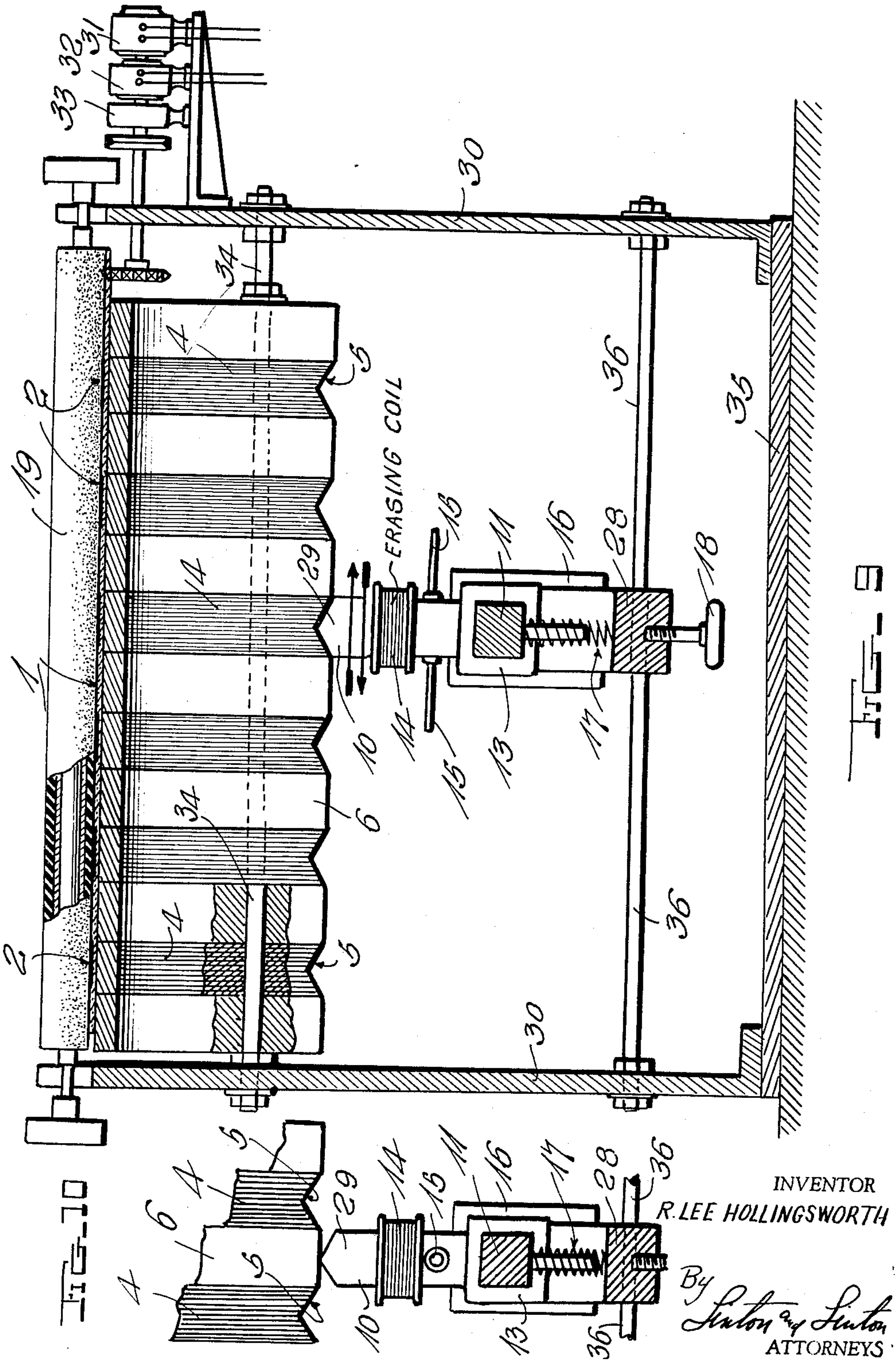
FIG. 9 is a transverse vertical section of the recording head of FIG. 7, showing the assembled upper individual gap magnetic pieces to register with the respective sound tracks, and the retractable and selectively positionable and engageable lower winding-carrying portion of the magnetic head.
FIG. 10 is a detail of FIG. 9 showing in retracted position the lower winding-carrying portion of the magnetic head, withdrawn from engagement with any upper magnetic piece, and touching only an interstitial non-magnetic piece of the upper portion.

FIG. 9 is a transverse vertical section of the recording head of FIG. 7 and shows the assembled upper individual gap magnetic pieces to register with the respective sound tracks, and the retractable and selectively positionable and engageable lower winding-carrying portion of the magnetic head.

In FIG. 9, the tape 1 has sound tracks 2 which register with magnetic laminae 4, respectively, which have V slots 5 at their free ends. The stack of laminae are held together by bolt 34 which is mounted on a frame 30. The take-off reel on which the tape is wound is driven selectively by a high-speed motor 31 or a low-speed motor 32. A gear reduction box is shown at 33. The rods 36 on which frame 28 and piece 10 slide, are mounted on frame 30.

FIG. 10 shows the lower piece 10 in retracted position and out of magnetic-circuit-closing engagement with a magnetic lamina of the upper piece 3, with the point 29 of piece 10 urged to touch a non-magnetic interstitial lamina 6.

Figure 11:
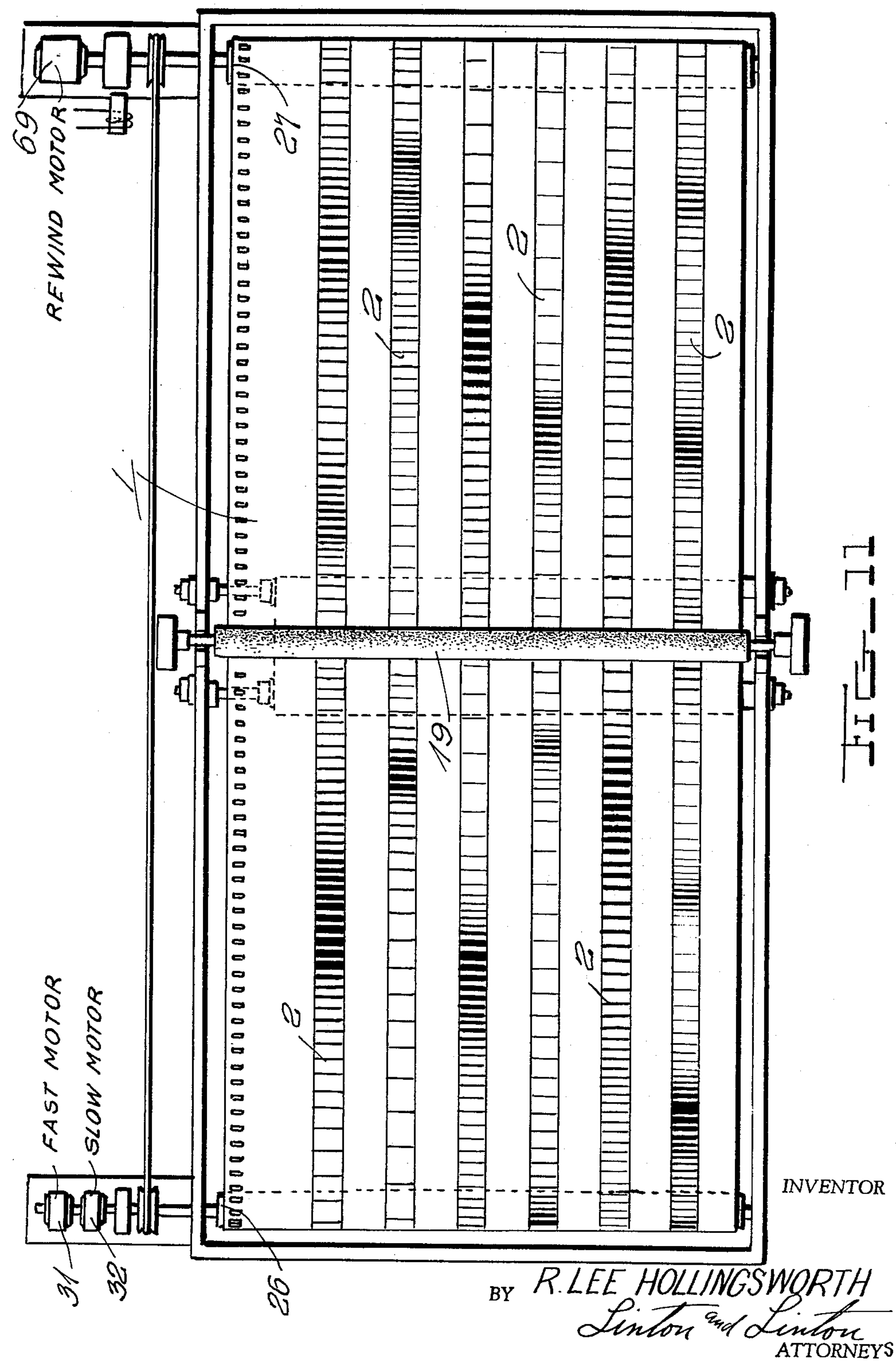
FIG. 11 is a top plan view of the assembled apparatus of FIG. 7.

FIG. 11 is a top plan view of the assembled apparatus of FIG. 7, and shows take-off reel 27 with its driving motors, and also shows loading reel 26 with rewind motor 69, and magnetic brake unit 69*a*, which supplies drag when tape is moving and stopped, and magnetic brake unit 69*a*, which supplies drag when the tape is un-reeling.

Figure 12:
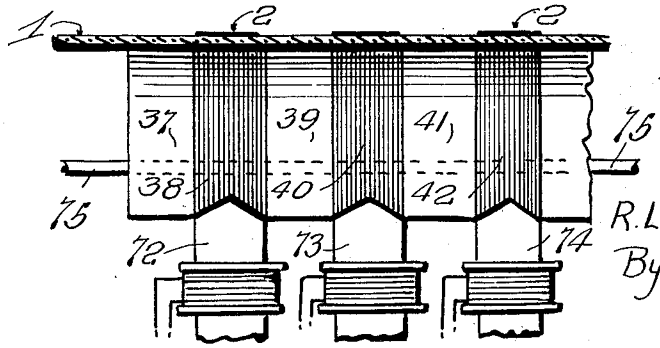
FIG. 12 is a sectional view taken on the line 12—12 of FIG. 13 and shows an assembly of a plurality of upper gap magnetic pieces, and a plurality of lower winding carrying magnetic pieces respectively engageable therewith and each carrying its own individual windings.

FIG. 12 shows an embodiment in which a plurality of lower U-shaped magnetic elements are provided, one for each sound track, and each with its own individual windings, so that there may be a winding-bearing lower element in engagement with each magnetic lamina of the upper gap magnetic elements, so that all tracks may be reproduced at the same time, and if desired may be combined in a suitable manner as to produce a television picture. Lower magnetic elements 72, 73, 74, respectively engage upper magnetic laminae 38, 40, 42, which are separated by non-magnetic laminae 37, 39, 41, and the laminae are bolted together by bolt 75, a salient feature here provides that a single winding holding unit can be replaced without disturbing the gap relationship.

Figure 13:
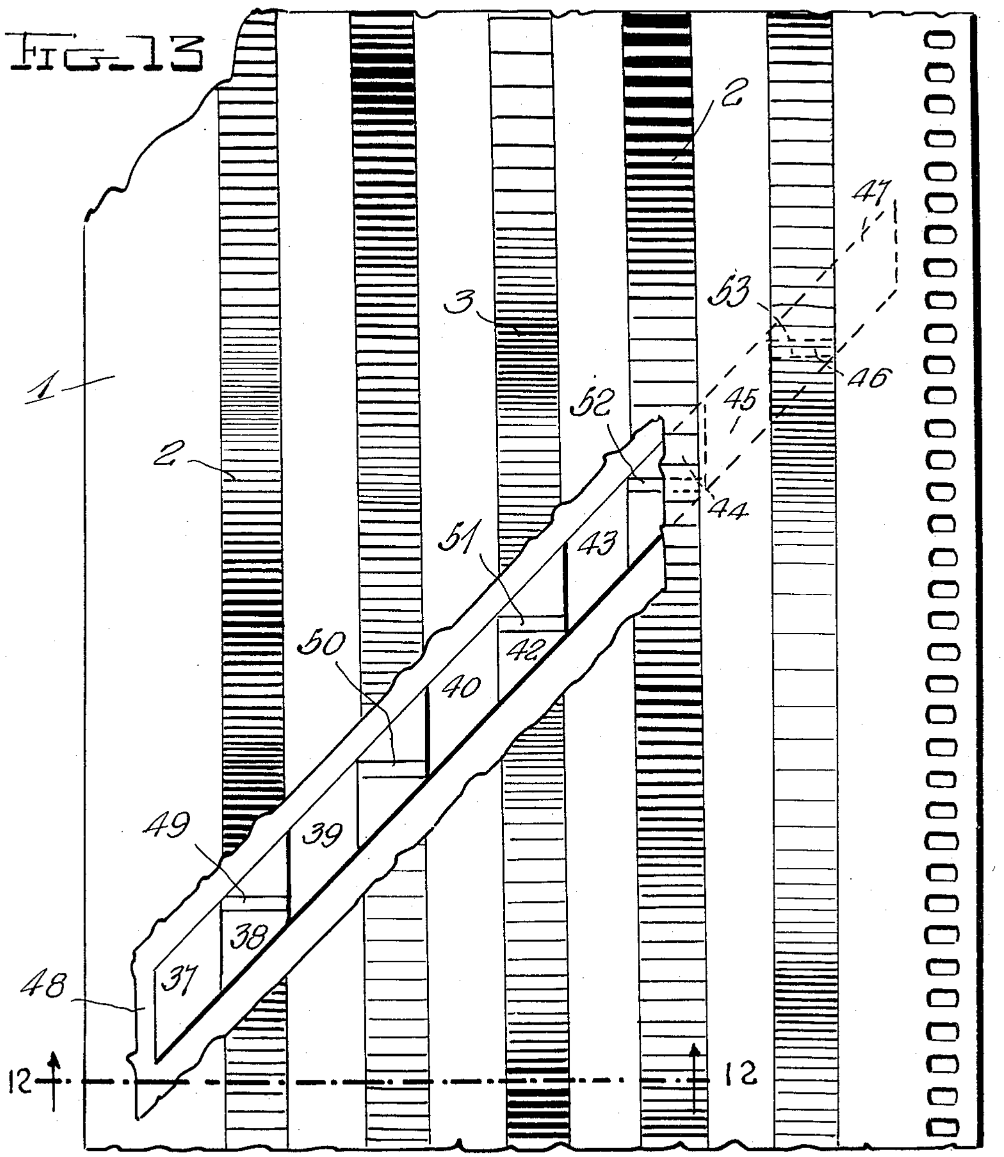
FIG. 13 is a plan view with parts broken away and shows a modification in which the multiple recording head unit is positioned obliquely to the edge of the tape.

FIG. 13 shows in relation to a multi-track magnetic tape, a magnetic head 48 positioned at an oblique angle to the edge of the magnetic tape, wherein the recording gaps are cut in the respective magnetic laminae in a direction perpendicular to the edge of the tape, so that the respective gaps 49, 50, 51, 52, 53, are not colinear. The magnetic laminae are shown at 38, 40, 42, 44, 46, and the non-magnetic interstitial laminae are shown at 37, 39, 41, 43, 45, 47. This provides more active tape area for reproduction when a narrow tape is used and permits the use of a larger number of recording heads as in FIG. 12. Indeed the gaps may be offset only 50% of their width.

Figure 14:
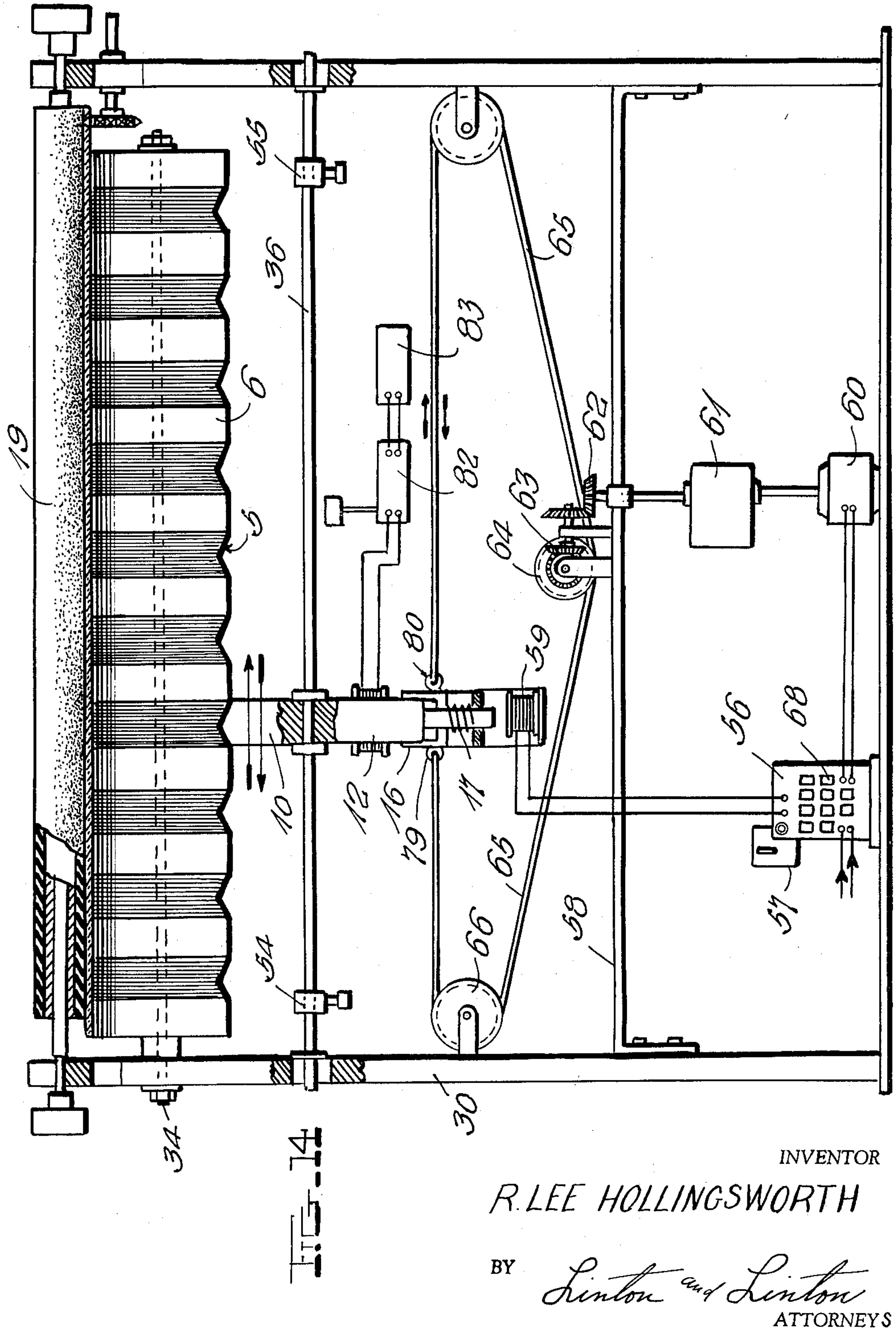
FIG. 14 is a side elevation with parts in section and shows the details of the application of my invention to selective coin controlled selective reproducing apparatus.

FIG. 14 shows the upper and lower magnetic pieces of the recording head and their accessory parts as in FIG. 7, but in addition shows parts necessary for the application of my invention to reproduction in public places as in a coin-controlled apparatus. In FIG. 14 there is shown at 57 a coin-receiving unit 57, which upon insertion of a coin acts as a switch to cause retraction of lower magnetic element 10 from engagement with upper magnetic element 3. This is accomplished by energization of an electromagnet 59 which attracts elements 10 downward against the action of spring 17. The panel 56 includes a plurality of buttons 68, one of which may be depressed to select a desired program which is on one of the sound tracks of tape 1. Each button provides for closing for a different appropriate length of time the energizing circuit of a drive traversing motor 60, which through gear box 61 and gears 62, 63 and drive pulley 64, drives for a precisely determined length of time and through a determined length of travel, a cable 65 which is attached by eyes 79, 80, to the frame and slideways 16 carrying lower magnetic elements 10, and causes traversing motion of magnetic element 10 from registration with one magnetic lamina of upper magnetic head member 3, into registration with another desired magnetic lamina, after piece 10 has been retracted from engagement with a magnetic element 4. After this traversing movement has been completed, the retracting magnet 59 is de-energized, and spring 17 urges piece 10 back into engagement with the newly selected magnetic lamina. The reproducing winding 12 is connected to an amplifier 82 and the reproducr 83 which may be a loud speaker or a television receiver. The soft rubber roller 19 may also be used in this embodiment for holding the tape against the recording gap, as previously described. The roller 19 is allowed to rest on the tape and holds it in proper position against the recording gap.

Stops 54 and 55 limit the traversing motion of piece 10.

In the construction of my invention it is very easy to remove a winding as 12, 13, 14, from the recording head, which is a difficult operation in a one-piece sound head of the prior art.

In the construction of magnetic gaps for video recording, as in the embodiment of FIG. 13, it is necessary to use a special method by milling the magnetic laminae to insure an extremely smooth surface. Very narrow gaps are used such as a width of 0.006 inch, and experimental gaps have been made having a width of 0.0001 inch. The gap is very carefully ground and polished. Non-magnetic filling material is placed in the gap to keep out stray material.

Ends of different shapes may be employed for the legs of lower magnetic piece 10, besides those which have been here described as conditions may require.

It is to be noted that in most all recording and read-out heads of magnetic tape recorders, the gap separation material gives less trouble if the separators be of the hardest possible non-magnetic material.

Intermittent air blasts or bursts supplied along the edges of the gaps have been found useful in dispersing the collected iron oxide particles from the area of the gap.

It has been helpful also to avoid failures, to have the very hard gap separator wedge extend a microscopic height above the gap to avoid wear of the area in the softer magnetic material in the gap edge areas.

I claim:

1. In a magnetic tape transducer system, a magnetic tape, a substantially horseshoe-shaped magnetic unit having two substantially parallel legs and a transverse portion connecting one end of the first said leg to a corresponding end of the other said leg, said transverse portion being provided with a transverse recording slot, means for causing said tape to pass over said slot in said transverse portion, a complementary U-shaped magnetic unit having two substantially parallel legs and a transverse portion connecting one end of a first leg thereof to an adjacent end of the second leg thereof, the free ends of the legs of said horseshoe unit and the free ends of the legs of said U-shaped unit being provided with mutually engageable terminal means, retracting means for retracting the terminal means of said U-shaped unit into and out of engagement with the terminal means of said horseshoe unit, and windings carried on said U-shaped unit.

2. In a magnetic tape transducer system, a tape having a plurality of spaced magnetic sound tracks, a substantially horseshoe-shaped magnetic unit having two substantially parallel legs and a transverse portion connecting one end of the first said leg to a corresponding end of the other said leg, said legs and said transverse portion being constituted of a plurality of magnetic laminae and interstitital non-magnetic laminae separating said magnetic laminae, said magnetic laminae corresponding in number and spacing to the recording tracks on said tape, said transverse portion being provided with a transverse recording slot, means for causing said tape to pass over said slot in said transverse portion, a complementary U-shaped magnetic unit formed of magnetic material and having two substantially parallel legs and a transverse portion connecting one end of a first leg thereof to an adjacent end of a second leg thereof, the free ends of the legs of said horseshoe unit and the free ends of the legs of said U-shaped unit being provided with mutually engageable terminal means, retracting means for retracting the terminal means of said U-shaped unit into and out of engagement with the terminal means of said horseshoe unit, a winding carried on said U-shaped unit, and traversing means for laterally traversing said U-shaped unit into registration with any selected said magnetic lamina.

3. In a magnetic tape transducer system, a tape having a plurality of magnetic sound track areas, a substantially horseshoe-shaped magnetic unit having two substantially parallel legs and a transverse portion connecting one end of the first said leg to a corresponding end of the other said leg, said legs and said transverse portion being constituted of a plurality of magnetic laminae and interstitial non-magnetic laminae separating said magnetic laminae, said magnetic laminae corresponding in number and spacing to the intelligence track areas on said tape, said transverse portion being provided with a transverse recording slot, means for causing said tape to pass over said slot in said transverse portion, a complementary U-shaped magnetic unit formed of magnetic material and having two substantially parallel legs and a transverse portion connecting one end of a first leg thereof to an adjacent end of a second leg thereof, the free ends of each magnetic lamina of said horseshoe unit being respectively provided with a recess and the free ends of the legs of said U-shaped unit being provided with a projection engageable with a said recess in a said magnetic lamina, retracting means for retracting said U-shaped unit and its terminal projection into and out of engagement with the slot in one said magnetic lamina, a winding carried on said U-shaped unit, and traversing means for laterally traversing said U-shaped unit when retracted into registration with any selected said magnetic lamina.

4. In combination a transducer system according to claim 2, said means for causing said tape to pass over said slot comprising a driving motor, said magnetic laminae and said non-magnetic laminae being electrically conductive, and the energizing circuit of said motor being connected in series between a said lamina of said horseshoe unit and a leg of said U-shaped unit for closing the energizing circuit of said motor when the legs of said units interengage.

5. In combination a transducer system according to claim 2, and a soft resilient rubber roller mounted over said tape adjacent said recording slot and adapted to urge said tape against the surfaces of said magnetic laminae adjacent said recording slot, by the weight of said rubber roller.

6. A transducer system according to claim 2, and said retracting means comprising resilient means for normally maintaining said U-shaped unit into engagement with said horseshoe unit, and further comprising an electromagnet adapted when energized to retract against the action of said resilient means said U-shaped unit from engagement with said horseshoe unit, and said traversing means comprising electric motor means operatively connected to said U-shaped unit for laterally traversing the same into registration with any selected said magnetic lamina, electrical switch means for energizing said electromagnet of said retracting means, and selective electrical control means electrically connected to said electric motor means and adapted to cause said electric motor means to precisely laterally transverse said U-shaped unit and its terminal means into exact registration with a selected said magnetic lamina.

7. The invention in accordance with claim 2, wherein said transverse recording slots are uniformly offset lengthwise of the recording media.

References Cited in the file of this patent

UNITED STATES PATENTS

| | | |
|---|---|---|
| 2,053,268 | Davis | Sept. 8, 1936 |
| 2,291,476 | Kernkamp | July 28, 1942 |
| 2,476,599 | Haloski | July 19, 1949 |
| 2,517,808 | Sziklai | Aug. 8, 1950 |
| 2,540,711 | Camras | Feb. 6, 1951 |
| 2,674,659 | Buhrendorf | Apr. 6, 1954 |
| 2,735,899 | Essel | Feb. 21, 1956 |
| 2,776,371 | Clogston | Jan. 1, 1957 |
| 2,831,180 | Hasbrouck | Apr. 15, 1958 |
| 2,922,855 | Ducati | Jan. 26, 1960 |

FOREIGN PATENTS

| | | |
|---|---|---|
| 430,780 | Great Britain | June 25, 1935 |
| 760,874 | Great Britain | Nov. 7, 1956 |